(12) United States Patent
Spyrou et al.

(10) Patent No.: US 8,283,040 B2
(45) Date of Patent: Oct. 9, 2012

(54) RADIATION-CURABLE FORMULATIONS COMPRISING SILICA AND DISPERSANT AND FEATURING ENHANCED CORROSION CONTROL ON METAL SUBSTRATES

(75) Inventors: Emmanouil Spyrou, Schermbeck (DE); Holger Loesch, Herne (DE); Pedro Cavaleiro, Viersen (DE)

(73) Assignee: Evonik Degussa GmbH, Essen (DE)

( * ) Notice: Subject to any disclaimer, the term of this patent is extended or adjusted under 35 U.S.C. 154(b) by 213 days.

(21) Appl. No.: 12/520,873

(22) PCT Filed: Dec. 4, 2007

(86) PCT No.: PCT/EP2007/063205
§ 371 (c)(1),
(2), (4) Date: Jun. 23, 2009

(87) PCT Pub. No.: WO2008/077722
PCT Pub. Date: Jul. 3, 2008

(65) Prior Publication Data
US 2010/0093884 A1    Apr. 15, 2010

(30) Foreign Application Priority Data
Dec. 23, 2006 (DE) .......................... 10 2006 061 380

(51) Int. Cl.
*C08J 3/28* (2006.01)
*C09D 5/08* (2006.01)
*C09D 7/12* (2006.01)
*C09D 175/06* (2006.01)
*B32B 27/00* (2006.01)

(52) U.S. Cl. ..................... 428/423.1; 428/425.8; 522/83; 522/96; 522/103; 522/107; 522/182; 427/498; 427/512

(58) Field of Classification Search .................... 522/83, 522/96, 171, 103, 107, 120, 121; 427/508, 427/496, 498, 512; 428/423.1, 500, 425.8
See application file for complete search history.

(56) References Cited

U.S. PATENT DOCUMENTS

| | | | |
|---|---|---|---|
| 3,298,912 A | 1/1967 | Scherr | |
| 4,224,212 A | 9/1980 | Topham | |
| 4,407,984 A * | 10/1983 | Ratcliffe et al. | 522/14 |
| 4,698,099 A | 10/1987 | Nakamura et al. | |
| 5,128,387 A | 7/1992 | Shustack | |
| 5,143,952 A | 9/1992 | Saheki et al. | |
| 5,885,341 A | 3/1999 | Standke et al. | |
| 5,980,619 A * | 11/1999 | Braig et al. | 106/14.12 |
| 6,562,474 B1 * | 5/2003 | Yoshimi et al. | 428/472.3 |
| 6,747,070 B2 | 6/2004 | Wenning et al. | |
| 6,825,240 B2 * | 11/2004 | Wenning et al. | 522/90 |
| 6,855,792 B2 | 2/2005 | Speier et al. | |
| 6,861,465 B2 | 3/2005 | Wenning et al. | |
| 6,924,385 B2 | 8/2005 | Lettmann et al. | |
| 6,960,620 B2 | 11/2005 | Wenning et al. | |
| 7,151,123 B2 * | 12/2006 | Ramsey | 522/96 |
| 7,420,005 B2 * | 9/2008 | Hojo et al. | 522/81 |
| 2004/0266899 A1 | 12/2004 | Muenz et al. | |
| 2005/0027082 A1 | 2/2005 | Narayan-Sarathy et al. | |
| 2005/0171227 A1 | 8/2005 | Weine Ramsey | |
| 2007/0212554 A1 * | 9/2007 | Yen et al. | 428/423.1 |
| 2008/0200577 A1 * | 8/2008 | Spyrou et al. | 522/3 |

FOREIGN PATENT DOCUMENTS

| | | |
|---|---|---|
| CN | 1421500 | 6/2003 |
| DE | 10 2006 045 041 | 3/2008 |
| EP | 0 208 041 | 1/1987 |
| EP | 0 417 490 | 8/1990 |
| JP | 62 110779 | 5/1987 |
| JP | 62-110779 | 5/1987 |
| JP | 6-313127 | 11/1994 |
| JP | 2001-172554 | 6/2001 |
| JP | 2003 599203 | 6/2003 |
| WO | 00/24503 | 5/2000 |
| WO | 01/21298 | 3/2001 |
| WO | 2005/087817 | 9/2005 |
| WO | 2007/003462 | 1/2007 |
| WO | 2008/037535 | 4/2008 |
| WO | 2008/077673 | 7/2008 |
| WO | 2008 077673 | 7/2008 |

OTHER PUBLICATIONS

U.S. Appl. No. 12/440,927, filed Mar. 12, 2009, Spyrou, et al.
U.S. Appl. No. 12/933,028, filed Sep. 16, 2010, Spyrou.
U.S. Appl. No. 12/673,390, filed Feb. 12, 2010, Wassmer, et al.
U.S. Appl. No. 12/673,289, filed Feb. 12, 2010, Koschabek, et al.
U.S. Appl. No. 12/161,112, filed Jul. 16, 2008, Standke, et al.
U.S. Appl. No. 12/675,057, filed Feb. 24, 2010, Spyrou, et al.
J. Bieleman, "Vorwort", Wiley-VCH, pp. 115-169. (Jan. 1997).
J. Bieleman, "Vorwort", Wiley-VCH, pp. 150-165. (Jan. 1997).

* cited by examiner

*Primary Examiner* — Susan W Berman
(74) *Attorney, Agent, or Firm* — Oblon, Spivak, McClelland, Maier & Neustadt, L.L.P.

(57) ABSTRACT

The invention relates to silica-containing radiation-curable formulations which in the cured state offer a particular degree of corrosion control for metallic substrates.

26 Claims, No Drawings

RADIATION-CURABLE FORMULATIONS COMPRISING SILICA AND DISPERSANT AND FEATURING ENHANCED CORROSION CONTROL ON METAL SUBSTRATES

The invention relates to silica-containing radiation-curable formulations which in the cured state offer a particular degree of corrosion control for metallic substrates.

Radiation-curable formulations are known.

Ethylenically unsaturated prepolymers are described in, for example, P. K. T. Oldring (ed.), "Chemistry and Technology of UV and EB Formulations for Coatings, Inks and Paints", vol. II., SITA Technology, London 1991, based for example on epoxy acrylates (pages 31 to 68), urethane acrylates (pages 73 to 123) and melamine acrylates (pages 208 to 214). Formulations of this kind are frequently mentioned in the patent literature as well: examples include JP 62110779 and EP 947 565.

The coating of metallic substrates poses a particular problem for radiation-curable formulations, since processes of contraction may result in loss of adhesion. For such substrates it is therefore common to use adhesion promoters containing phosphoric acid. Examples of such are U.S. Pat. No. 5,128,387 (coating of beer cans) and JP 2001172554 (coating of various cans).

Epoxy acrylates are known to exhibit outstanding adhesion and effective corrosion control on metal substrates. A disadvantage of such coatings, however, is the low level of deformability after curing. For certain coating technologies, coil coating being one example, the deformability of the coated workpieces without the coating cracking is critical. Moreover, on account of their aromatic fractions, coatings of this kind have a tendency towards yellowing.

WO 03/022945 describes low-viscosity radiation-curable formulations for metal substrates that are based on radiation-curable resins, monofunctional reactive diluents, and acidic adhesion promoters. The resins employed are commercial products from a variety of suppliers.

EP 902 040 as well embraces radiation-curable formulations. Described therein are urethane (meth)acrylates with monofunctional esters of an unsaturated carboxylic acid, which are esterified with alcohols containing a carbocyclic or heterocyclic ring.

The use of silicas in coating materials is described in, for example, the brochure "AEROSIL für Lacke and Farben" (No. 68 from the Pigments series, 3rd edition, issue date December 1989, Degussa AG). Recommended therein is 0.5% to 1% silica (AEROSIL R 972), depending on the formulation, for the purpose of increasing the corrosion resistance (p. 12).

For the dispersing of solids (e.g. fillers, dyes or pigments) in liquid media it is common to use dispersants, in order to achieve effective dispersing of the solids.

Dispersants are likewise used in the production of paints, varnishes, printing inks and other coating materials.

An object was to find radiation-curable formulations which on the one hand are readily deformable, i.e. flexible, after coating, but on the other hand also ensure outstanding corrosion control for metal substrates.

Surprisingly it has been found that the corrosion resistance of coating materials based on radiation-curable formulations on metallic substrates increases if at least 5% by weight of silica and, in addition, dispersants are included in the formulation.

The present invention provides a radiation-curable formulation composed of
A) at least one radiation-curable resin,
B) at least 5% by weight of silica, based on the total formulation,
C) at least one adhesion promoter,
D) at least one radiation-curable reactive diluent,
E) at least one dispersant,
F) optionally photoinitiators,
G) optionally pigments and other adjuvants.

The preparation of radiation-curable resins A), oligomers and/or polymers is described in, for example, "Radiation Curing in Polymer Science & Technology, Vol. I: Fundamentals and Methods" by J. P. Fouassier, J. F. Rabek, Elsevier Applied Science, London and New York, 1993, chapter 5, pages 226 to 236, in "Lackharze" [Resins for Coatings], D. Stoye, W. Freitag, Hanser-Verlag, Vienna, 1996, pages 85, 94-98, 169 and 265, and in EP 947 565.

A distinction according to raw materials basis is made between, for example, epoxy acrylates, polyester acrylates, polyether acrylates, polyacrylate acrylates, and urethane acrylates. The latter may be based, for example, on polyesters or else on polyethers. The corresponding methacrylates are known as well. Other polymerizable groups are epoxides and vinyl ethers. These too may be attached to different base resins.

The amount of A) in the formulation varies from 5% to 95% by weight, preferably 10% to 39% by weight. Particular preference is given to polyesterurethane acrylates. Examples thereof are VESTICOAT EP 110 IBOA (commercial product of Degussa, Coatings & Colorants, difunctional polyesterurethane acrylate) and EBECRYL 1256 (commercial product of Cytec).

Among silicas B) a distinction is made between precipitated silicas and fumed silicas.

In terms of production volume, the precipitated silicas have by far the greatest significance. They are prepared from an aqueous alkali metal silicate solution by precipitation with mineral acids. This forms colloidal primary particles, which as reaction progresses undergo agglomeration and finally fuse together to form aggregates. The pulverous, voluminous forms possess pore volumes from 2.5 to 15 ml/g and specific surface areas from 30 to 800 $m^2$/g. In the context of the invention, precipitated silicas are used in the form of dry powders. They are sold by Degussa, for example, under the trade name SIPERNAT.

Fumed silicas is a term encompassing highly disperse silicas produced by flame hydrolysis. In this procedure, silicon tetrachloride is decomposed in an oxyhydrogen gas flame. Fumed silicas possess far fewer OH groups on their virtually pore-free surface than precipitated silicas. On account of their hydrophilicity, which is a consequence of the silanol groups, the synthetic silicas are frequently subjected to chemical aftertreatment processes, in which the OH groups react with, for example, organic chlorosilanes. This produces modified surfaces, hydrophobic surfaces for example, which substantially expand the performance properties of the silicas. Fumed silicas are sold by Degussa, for example, under the trade name AEROSIL™.

Important parameters of such silicas include, for example, the specific BET surface area, the carbon content, the tapped density, the loss on drying, the $SiO_2$ content after calcining, the pH of the dispersion, the surface tension, and also other, secondary constituents (e.g. aluminium, iron, titanium and hydrochloric acid). In general the fumed silicas have the following characteristic data: BET: 30 to 380 $m^2$/g, preferably 70 to 250 $m^2$/g; pH: 2.5 to 11, preferably 3 to 7.

Particular preference is given in accordance with the invention to using fumed silicas. Hydrophobic fumed silicas are particularly preferred, among which AEROSIL™ R 9200 from Degussa GmbH, Germany, is used with preference.

The fraction of silica B) as a proportion of the total formulation is 5% -25% by weight, preferably 10% to 20% by weight. In accordance with the invention the silicas are used in powder form.

Adhesion promoters C) for radiation-curable formulations for metallic substrates are generally composed of phosphoric acid and/or phosphonic acid and/or reaction products thereof (e.g. esters) with functionalized acrylates. While the free phosphoric acid groups are responsible for the direct adhesion to the metal, the acrylate groups ensure a bond with the coating matrix. Products of this kind are also described in WO 01/98413, in JP 08231564, and in JP 06313127.

Typical commercial products are EBECRYL 169 and 170 from Cytec, ALDITOL Vxl 6219 from VIANOVA, CD 9050 and CD 9052 from Sartomer, SIPOMER PAM-100, SIPOMER PAM-200 and SIPOMER PAM-300 from Rhodia, and GENORAD 40 from Rahn. The amount of C) in the formulation is 0.1% to 10% by weight, preferably from 1% to 5% by weight.

Radiation-curable reactive diluents D) and their preparation are described in, for example, "Radiation Curing in Polymer Science & Technology, Vol. I: Fundamentals and Methods" by J. P. Fouassier, J. F. Rabek, Elsevier Applied Science, London and New York, 1993, chapter 5, pages 237 to 240. Generally speaking these are acrylate- or methacrylate-containing compounds which are liquid at room temperature and hence are able to lower the overall viscosity of the formulation. Examples of such products are isobornyl acrylate, hydroxypropyl methacrylate, trimethylolpropane formal monoacrylate, tetrahydrofurfuryl acrylate, phenoxyethyl acrylate, trimethylolpropane triacrylate, dipropylene glycol diacrylate, tripropylene glycol diacrylate, hexanediol diacrylate, pentaerythritol tetraacrylate, lauryl acrylate, and propoxylated or ethoxylated variants of these reactive diluents, but also urethanized reactive diluents such as EBECRYL 1039 (Cytec) and others. Also suitable are other liquid components capable of reacting under conditions of free-radical polymerization, e.g. vinyl ethers or allyl ethers. The amount of D) in the formulation is 5% to 90% by weight, preferably 10% to 70% by weight.

A large number of different substances are suitable as dispersants E). Besides very simple compounds of low molecular mass, such as lecithin, fatty acids or their salts or alkylphenol ethoxylates, for example, it is also possible to use more complex, high molecular mass structures as dispersants. Here, amino-functional and amido-functional systems especially are used.

U.S. Pat. No. 4,224,212, EP 0 208 041, WO 00/24503 and WO 01/21298 describe, for example, dispersants based on polyester-modified polyamines. DE 197 32 251 describes polyamine salts and their use as dispersants for pigments and fillers. Dispersants are used in concentrations from 0.5% to 5% by weight, based on the total formulation. Examples of such dispersants are TEGODISPERS 610, 630, 650, 651, 652, 653, 655, 700 and 710, LA-D 1045, LAD 868 (all Degussa, Coatings & Colorants, TEGO), DISPERBYK 110, 168, 171, 174, 180 and 190, and HORDAPHOS 1306, HYDROPALAT and HOSTAPHAT OPS (Clariant).

Photoinitiators F) and their preparation are described in, for example, "Radiation Curing in Polymer Science & Technology, Vol. II: Photoinitiating Systems" by J. P. Fouassier, J. F. Rabek, Elsevier Applied Science, London and New York, 1993. Frequently they are α-hydroxy ketones or derivatives thereof. If present, the photoinitiators can be included in amounts from 0.2% to 10% by weight.

Suitable pigments G) in radiation-curable formulations are described in, for example, "Radiation Curing in Polymer Science & Technology, Vol. IV: Practical Aspects and Application" by J. P. Fouassier, J. F. Rabek, Elsevier Applied Science, London and New York, 1993, chapter 5, pages 87 to 105, and can be included in amounts from 1% to 40% by weight. Examples of anti-corrosion pigments are found, for example, in Pigment+Füllstoff Tabellen, O, Lückert, Vincentz Verlag Hanover, 6th edition 2002. Examples include the following: SHIELDEX C 303 (Grace Davison) and HALOX Coil X 100, HALOX Coil X 200 and HALOX CW 491 (Erbslöh), HEUCOPHOS SAPP or else ZPA (Heubach), K-White TC 720 (Tayca) and HOMBICOR (Sachtleben). Of course, simple inorganic salts such as zinc phosphate, for example, are also suitable.

Other adjuvants G) for radiation-curable formulations are available in various compositions and for diverse purposes, examples being flow control agents, matting agents, degassing agents, etc. Some of them are described in the brochure "SELECTED DEGUSSA PRODUCTS FOR RADIATION CURING AND PRINTING INKS", published by Tego Coating & Ink Additives, Essen, 2003. The amount of such additives varies from 0.01% to 5% by weight, if present.

The radiation-curable formulation may be applied by techniques that are known within coatings technology, such as knife coating, rolling, spraying or injecting, for example.

The most suitable metallic substrate is steel, optionally pretreated, but suitability as metallic substrate is also possessed by aluminium and other metals or alloys that are given a coating on grounds of corrosion control.

Curing is accomplished in the presence of photoinitiators under UV light or in the absence of photoinitiators under electron beams. The properties of the cured coating materials are largely independent of the curing methods.

UV curing and UV lamps are described in, for example, "Radiation Curing in Polymer Science & Technology, Vol. I: Fundamentals and Methods" by J. P. Fouassier, J. F. Rabek, Elsevier Applied Science, London and New York, 1993, chapter 8, pages 453 to 503.

Electron beam (EB) curing and EB curing agents are described in, for example, "Radiation Curing in Polymer Science & Technology, Vol. I: Fundamentals and Methods" by J. P. Fouassier, J. F. Rabek, Elsevier Applied Science, London and New York, 1993, chapter 4, pages 193 to 225 and chapter 9, pages 503 to 555.

The invention further provides for the use of a radiation-curable formulation composed of
A) at least one radiation-curable resin,
B) at least 5% by weight of silica, based on the total formulation,
C) at least one adhesion promoter,
D) at least one radiation-curable reactive diluent,
E) at least one dispersant,
F) optionally photoinitiators,
G) optionally pigments and other adjuvants as a primer, intercoat, topcoat and/or clearcoat material.

The coating of the invention can be used either alone or else as one coat of a multi-coat system. It may be applied, for example, as a primer, as an intercoat or as a topcoat or clearcoat. The coats above or below the coating of the invention may be cured either conventionally, thermally, or else, alternatively, by means of radiation.

Likewise provided by the invention is the use of a radiation-curable formulation composed of A) at least one radiation-curable resin,
B) at least 5% by weight of silica, based on the total formulation,
C) at least one adhesion promoter,
D) at least one radiation-curable reactive diluent,
E) at least one dispersant,
F) optionally photoinitiators,
G) optionally pigments and other adjuvants for producing a coating by the coil coating process.

Further provided by the present invention are coatings containing the formulations according to the invention.

Even without further remarks it is assumed that a person skilled in the art would be able to utilize the above description to its widest extent. Consequently the preferred embodiments and examples are to be interpreted merely as a descriptive disclosure which in no way has any limiting effect whatsoever. The present invention is elucidated below with reference to examples. Alternative embodiments of the present invention are obtainable analogously.

EXAMPLES

| Ingredients | Product description, manufacturer |
|---|---|
| VESTICOAT EP 110/ IBOA | Radiation-curable resin, Degussa AG, Coatings & Colorants, in solution in 25% IBOA |
| LAROMER 8887 | Trimethylolpropane monoformal acrylate, BASF, radiation-curable reactive diluent |
| IBOA | Isobornyl acrylate, Cytec, mono-functional reactive diluent |
| ADDITOL VXL 6219 | Adhesion promoter containing phosphoric acid, Sartomer |
| IRGACURE 184 | Photoinitiator, Ciba |
| AEROSIL R 9200 | Fumed silica, Degussa, BET about 170 m$^2$/g, SiO$_2$ content after calcining >99.5%, pH 3-5, CAS No. 68611-44-9 |
| PZ 20 zinc phosphate | Zinc phosphate, SNCZ |
| Tegodispers 652 | Dispersant, Degussa AG, Coatings & Colorants, TEGO |

A) General Preparation Instructions

The resin is mixed with reactive diluent and silica and the mixture is dispersed in a Dispermate at 9000 rpm for 20 minutes. Thereafter the adhesion promoter is incorporated by stirring with a high-speed stirrer (2000 rpm).

a) Electron beam curing: The operative formulation is applied by knife coating to steel panels (Q-panel R36, untreated steel panel) and subsequently cured under an electron beam emitter (5 Mrad, ESI).

b) UV curing: 3% of IRGACURE 184 are added to the aforementioned mixture, and incorporated by stirring using the high-speed stirrer (2000 rpm). The operative formulation is applied by knife coating to steel panels (Q-panel R36) and subsequently cured under a UV lamp (3 m/min, Minicure, mercury vapour lamp, 80 W/cm, Technigraf).

All figures in % by weight based on the total weight of the formulation.

| | Test | | | | | |
|---|---|---|---|---|---|---|
| | 1* | 2* | 3* | 4* | 5* | 6 |
| Vesticoat EP 110/ IBOA | 20.0 | 20.0 | 20.0 | 20.0 | 20.0 | 20.0 |
| IBOA | 22.5 | 29.5 | 19.5 | 26.5 | 26.5 | 19.5 |
| Laromer 8887 | 27.5 | 34.5 | 27.5 | 34.5 | 34.5 | 27.5 |
| Aerosil VP 9200 | 15.0 | 1.0 | 15.0 | 1.0 | 1.0 | 15.0 |
| ADDITOL VXL 6219 | 5.0 | 5.0 | 5.0 | 5.0 | 5.0 | 5.0 |
| IRGACURE 184 | — | — | 3.0 | 3.0 | — | — |
| PZ 20 | 10.0 | 10.0 | 10.0 | 10.0 | 10.0 | 10.0 |
| Tegodispers 652 | | | | | 3 | 3 |
| 144 h salt spray test (scribe creep [cm]) | 9.8 | >15 | 10.2 | >15 | >15 | 4.7 |
| Erichsen cupping [mm] | 8.5 | 10.5 | 9.5 | 11 | 10.5 | 9 |
| Film thickness [µm] | 28-32 | 31-34 | 27-33 | 28-31 | 25-27 | 28-29 |

*Non-inventive, comparative tests 1,2 and 5,6 were cured by electron beams, 3 and 4 by UV rays. All coatings have sufficient flexibility (Erichsen cupping >5 mm). Only the inventive formulation 6 exhibits sufficient corrosion control (scribe creep<5 cm) after 144 h of salt spray testing (DIN 53167).

The invention claimed is:

1. A radiation-curable formulation comprising
   A) at least one ethylenically unsaturated radiation-curable resin,
   B) at least 5% by weight of silica, based on the total formulation,
   C) at least one adhesion promoter,
   D) at least one ethylenically unsaturated radiation-curable reactive diluent, and
   E) at least one dispersant selected from the group consisting of lecithin, a fatty acid, an alkylphenol ethoxylate of a fatty acid, and a salt of a fatty acid, present in an amount of from 0.5% to 5% by weight based on the total weight of the formulation,
   wherein said at least one radiation-curable resin is a polyesterurethane acrylate.

2. The radiation-curable formulation according to claim 1, wherein the amount of the resins A) is 5% to 95% by weight based on the total weight of the formulation.

3. The radiation-curable formulation according to claim 1, wherein said silica is a precipitated silica.

4. The radiation-curable formulation according to claim 1, wherein said silica is a precipitated silica having a pore volume of from 2.5 to 15 ml/g and a specific surface area of from 30 to 800 m$^2$/g.

5. The radiation-curable formulation according to claim 1, wherein said silica is a fumed silica.

6. The radiation-curable formulation according to claim 1, wherein said silica is a hydrophobic fumed silica.

7. The radiation-curable formulation according to claim 1, wherein the fraction of silica B) as a proportion of the total formulation is 5% to 25% by weight based on the total weight of the formulation.

8. The radiation-curable formulation according to claim 1, wherein the silica is in powder form.

9. The radiation-curable formulation according to claim 1, wherein said at least one adhesion promoter is at least one selected from the group consisting of a phosphoric acid and a phosphonic acid, and is present in amounts from 0.1% to 10% by weight based on the total weight of the formulation.

10. The radiation-curable formulation according to claim 1, wherein said at least one reactive diluent is at least one selected from the group consisting of isobornyl acrylate, hydroxypropyl methacrylate, trimethylolpropane formal monoacrylate, tetrahydrofurfuryl acrylate, phenoxyethyl acrylate, trimethylolpropane triacrylate, dipropylene glycol diacrylate, tripropylene glycol diacrylate, hexanediol diacrylate, pentaerythritol tetraacrylate and lauryl acrylate.

11. The radiation-curable formulation according to claim 1, wherein the amount of D) in the formulation is 5% to 90% by weight based on the total weight of the formulation.

12. The radiation-curable formulation according to claim 1, further comprising at least one selected from the group consisting of a photoinitiator, a pigment, and a further adjuvant.

13. The radiation-curable formulation according to claim 1, wherein the amount of the resins A) is 10% to 39% by weight based on the total weight of the formulation.

14. The radiation-curable formulation according to claim 1, wherein the fraction of silica B) as a proportion of the total formulation is 10% to 20% by weight based on the total weight of the formulation.

15. The radiation-curable formulation according to claim 1, wherein the amount of D) in the formulation is 10% to 70% by weight based on the total weight of the formulation.

16. The radiation-curable formulation according to claim 1 which is in the form of a liquid.

17. The radiation-curable formulation according to claim 1 wherein the adhesion promoter does not comprise phosphoric acid.

18. The radiation-curable formulation according to claim 1, wherein said at least one dispersant is selected from the group consisting of a fatty acid, an alkylphenol ethoxylate of a fatty acid, and a salt of a fatty acid.

19. The radiation-curable formulation according to claim 1, wherein said at least one dispersant is lecithin.

20. The radiation-curable formulation according to claim 1, wherein said at least one reactive diluent is a propoxylated or ethoxylated derivative of a compound selected from the group consisting of isobornyl acrylate, hydroxypropyl methacrylate, trimethylolpropane formal monoacrylate, tetrahydrofurfuryl acrylate, phenoxyethyl acrylate, trimethylolpropane triacrylate, dipropylene glycol diacrylate, tripropylene glycol diacrylate, hexanediol diacrylate, pentaerythritol tetraacrylate and lauryl acrylate.

21. A radiation-curable formulation comprising
A) at least one ethylenically unsaturated radiation-curable resin,
B) at least 5% by weight of silica, based on the total formulation,
C) at least one adhesion promoter,
D) at least one ethylenically unsaturated radiation-curable reactive diluent, and
E) at least one dispersant selected from the group consisting of lecithin, a fatty acid, an alkylphenol ethoxylate of a fatty acid, and a salt of a fatty acid, present in an amount of from 0.5% to 5% by weight based on the total weight of the formulation,
wherein said silica is a precipitated silica having a pore volume of from 2.5 to 15 ml/g and a specific surface area of from 30 to 800 m$^2$/g.

22. A cured coating obtained by curing the formulation according to claim 1 on a substrate.

23. A cured composition obtained by curing the radiation-curable formulation according to claim 1, in the form of a primer, an intercoat, a topcoat, a clearcoat, or a combination thereof.

24. A method for making a coating, comprising coil coating and curing the radiation-curable formulation according to claim 1 on a substrate.

25. A radiation-curable formulation comprising
A) at least one ethylenically unsaturated radiation-curable resin,
B) at least 5% by weight of silica, based on the total formulation,
C) at least one adhesion promoter,
D) at least one ethylenically unsaturated radiation-curable reactive diluent, and
E) a lecithin dispersant in an amount of from 0.5% to 5% by weight based on the total weight of the formulation.

26. A radiation-curable formulation comprising
A) at least one ethylenically unsaturated radiation-curable resin,
B) at least 5% by weight of silica, based on the total formulation,
C) at least one adhesion promoter,
D) at least one ethylenically unsaturated radiation-curable reactive diluent, and
E) at least one dispersant selected from the group consisting of a fatty acid, an alkylphenol ethoxylate of a fatty acid, and a salt of a fatty acid, present in an amount of from 0.5% to 5% by weight based on the total weight of the formulation.

* * * * *